Figure 1:
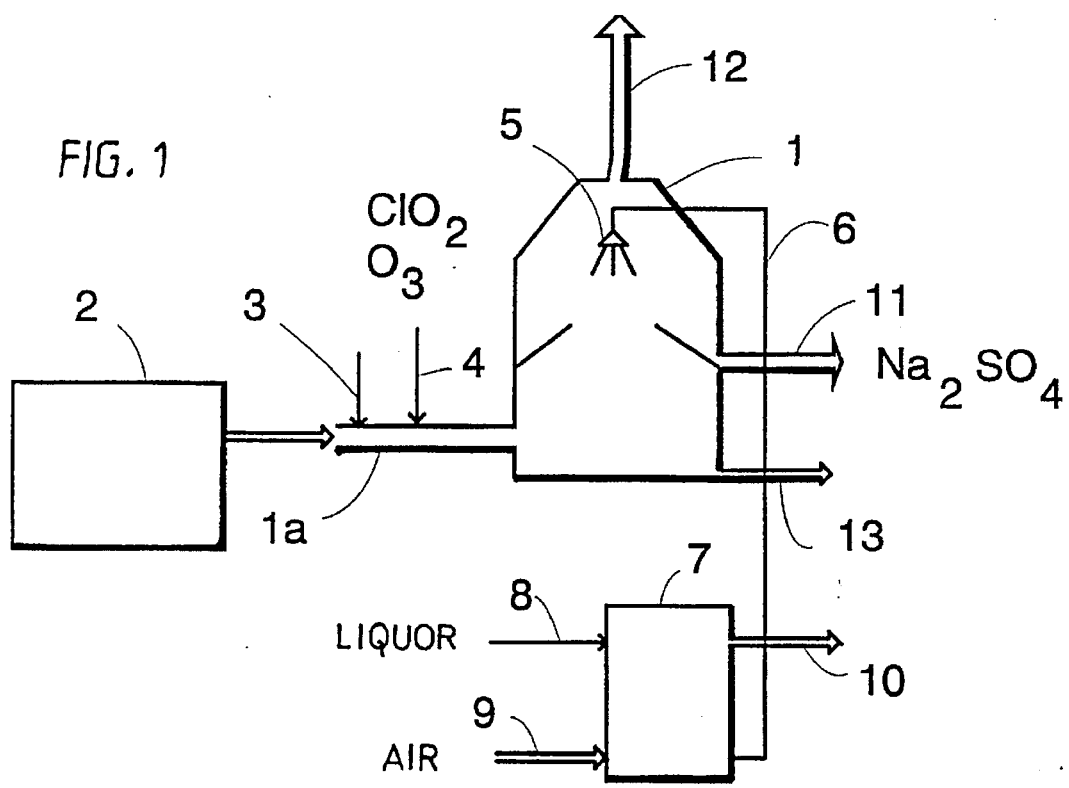

United States Patent [19]

Patrikainen et al.

[11] Patent Number: 5,639,434
[45] Date of Patent: Jun. 17, 1997

[54] PROCESS FOR REMOVING NITROGEN OXIDES FROM THE FLUE GASES OF A PULP MILL

[75] Inventors: Tapio Patrikainen, Oulu; Ari Tamminen; Seppo Tuominiemi, both of Pirkkala; Esa Pikkujämsä, Tampere; Jukka-Pekka Spets, Tampere; Risto Hämäläinen, Tampere, all of Finland

[73] Assignee: Tampella Power Oy, Tampere, Finland

[21] Appl. No.: 510,815

[22] Filed: Aug. 3, 1995

[30] Foreign Application Priority Data

Sep. 19, 1994 [FI] Finland .................................. 944344

[51] Int. Cl.[6] ................................................ C01B 21/00
[52] U.S. Cl. ................................................ 423/235
[58] Field of Search ................................ 423/235, 238

[56] References Cited

U.S. PATENT DOCUMENTS

| | | | |
|---|---|---|---|
| 4,035,470 | 7/1977 | Senjo et al. | 423/235 |
| 4,602,982 | 7/1986 | Samuelson | 162/40 |
| 4,750,973 | 6/1988 | Samuelson et al. | 162/65 |
| 4,981,556 | 1/1991 | Hedblom et al. | 162/29 |
| 5,192,517 | 3/1993 | Spink | 423/243.08 |

FOREIGN PATENT DOCUMENTS 1 472 985   5/1977   United Kingdom .

OTHER PUBLICATIONS

Anderson et al., Tappi Journal 74(1), Jan 1991 pp. 115–118.

Primary Examiner—Deborah Jones
Assistant Examiner—Amy M. Harding
Attorney, Agent, or Firm—Dressler, Rockey, Milnamow & Katz, Ltd.

[57] ABSTRACT

Process for removing nitrogen oxides from the flue gases of a soda recovery boiler of a pulp mill. In the method, to the flue gases of the soda recovery boiler is at first fed an oxidizing agent, such as chlorine dioxide or ozone, which oxidizes nitrogen oxide to nitrogen dioxide. Subsequently, the flue gases are led into a flue gas scrubber, in which a reagent coming from the circulation of chemicals of the pulp mill is injected into the flue gases, which reagent brought into contact with the nitrogen dioxide reduces the nitrogen dioxide to nitrogen. The flue gas containing nitrogen is led out of the scrubber and the oxidized reagent is led back to the circulation of chemicals of the pulp mill.

6 Claims, 2 Drawing Sheets

PROCESS FOR REMOVING NITROGEN OXIDES FROM THE FLUE GASES OF A PULP MILL

The invention relates to a process for removing nitrogen oxides from the flue gases of a soda recovery boiler of a pulp mill.

Up till now, hardly any attention has been paid to nitrogen oxide emissions, i.e. NOx emissions, of a pulp mill. However, the more stringent requirements for environmental protection compel the pulp mills into a new situation, in which the NOx emissions also have their standard values.

Attempts have been made to decrease the NOx content in the flue gases of a soda recovery boiler by injecting ammonia solution into the combustion furnace of the recovery boiler. It is, however, difficult to have this process under control, since it is difficult to find an injection point having a suitable temperature required by the reaction. The operation costs of the process are also high because of the high price of ammonia.

An effort has also been made to affect the NOx emissions from the soda recovery boiler by phasing the feeding of combustion air.

Efforts have been made to remove nitrogen oxides also from flue gases. One such process is disclosed in British Patent 1 472 985. In the process, flue gases are made wet with water, and subsequently, into the flue gases is mixed an oxidizer, such as chlorine dioxide or ozone, by which nitrogen monoxide is oxidized to nitrogen dioxide. Then the nitrogen dioxide is reduced to nitrogen by scrubbing the flue gases containing nitrogen and sulphur dioxide with a solution containing alkali metal or ammonium hydroxide, alkali metal or ammonium carbonate and alkali metal or ammonium bicarbonate. The bicarbonate present in the solution in question has been produced by the sulphur dioxide and hydroxide of the flue gases reacting with each other. This means that the flue gases must contain plenty of sulphur dioxide so that a sufficient amount of bisulphite required for removing $NO_2$ would be produced. In the solution set forth in this publication, separate reagents and oxidizers are used, which is rather expensive in economical sense.

The above process is used expressly in conventional power plants and in connection with conventional power boilers, when there is a sufficient amount of sulphur in the fuel and thus also in the flue gases for implementing the process. This is, however, not possible at the purification of flue gases of a soda recovery boiler of a pulp mill, since the flue gases do not contain enough sulphur, and consequently, it would be necessary to prepare the bisulphite solution required for the reduction of nitrogen separately by preparing at first a sufficient amount of sulphur dioxide and then from that said bisulphite solution. Thus the process according to the British publication cannot be applied as such directly to the purification of flue gases of a soda recovery boiler.

The object of this invention is to provide such a process by which nitrogen oxides from the flue gases of a soda recovery boiler of a pulp mill can be converted into nitrogen gas in an economic and simple way. The process according to the invention is characterized in that to the flue gases is at first fed an oxidizing agent, such as chlorine dioxide or ozone, which oxidizes the nitrogen oxide into nitrogen dioxide, the flue gas is led into a flue gas scrubber, in which a reagent coming from the circulation of chemicals of the pulp mill is injected into the flue gases, which reagent brought into contact with nitrogen dioxide reduces the nitrogen dioxide to nitrogen, after which the flue gas containing nitrogen is led out of the scrubber and the oxidized reagent is led back to the circulation of chemicals of the pulp mill.

The essential idea of the invention is that reagents already in use in the pulp mill are utilized for removing nitrogen oxides. As an oxidizing agent are utilized chlorine dioxide or ozone used for bleaching or exhaust gases containing chlorine dioxide from the bleaching plant. On the other hand, for the reduction of nitrogen oxide are used reagents already present in the circulation of chemicals of the pulp mill, such as oxidized or sulphited green liquor, sulphited white liquor, a sulphite solution produced by the sulphur dioxide scrubber of the odour gases combustion plant or a sulphite solution obtained by an alkali solution from the flue gas scrubbing of the soda recovery boiler, when flue gases containing sulphur dioxide and produced at the combustion of odor gases have been led to the flue gases of the soda recovery boiler.

An advantage of the invention is that reagents already in use or at least partly returnable to the circulation can be used in the process without the necessity of introducing new ones or preparing them from an expensive extra reagent introduced separately.

Figure 2:
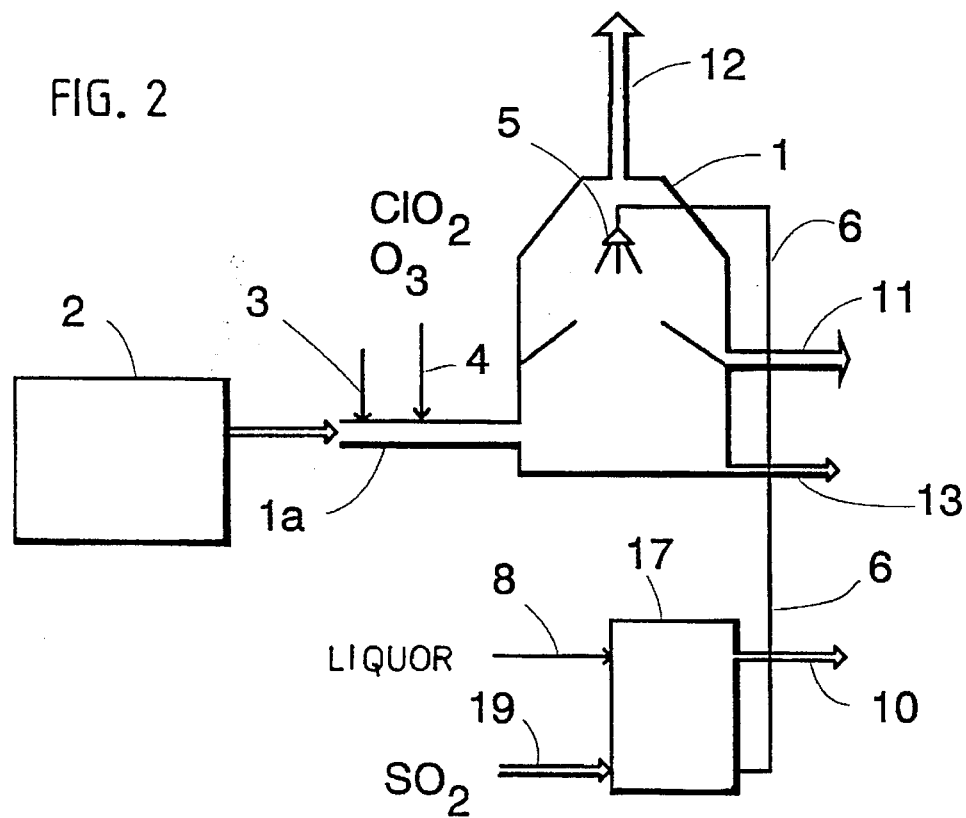
Figure 3:
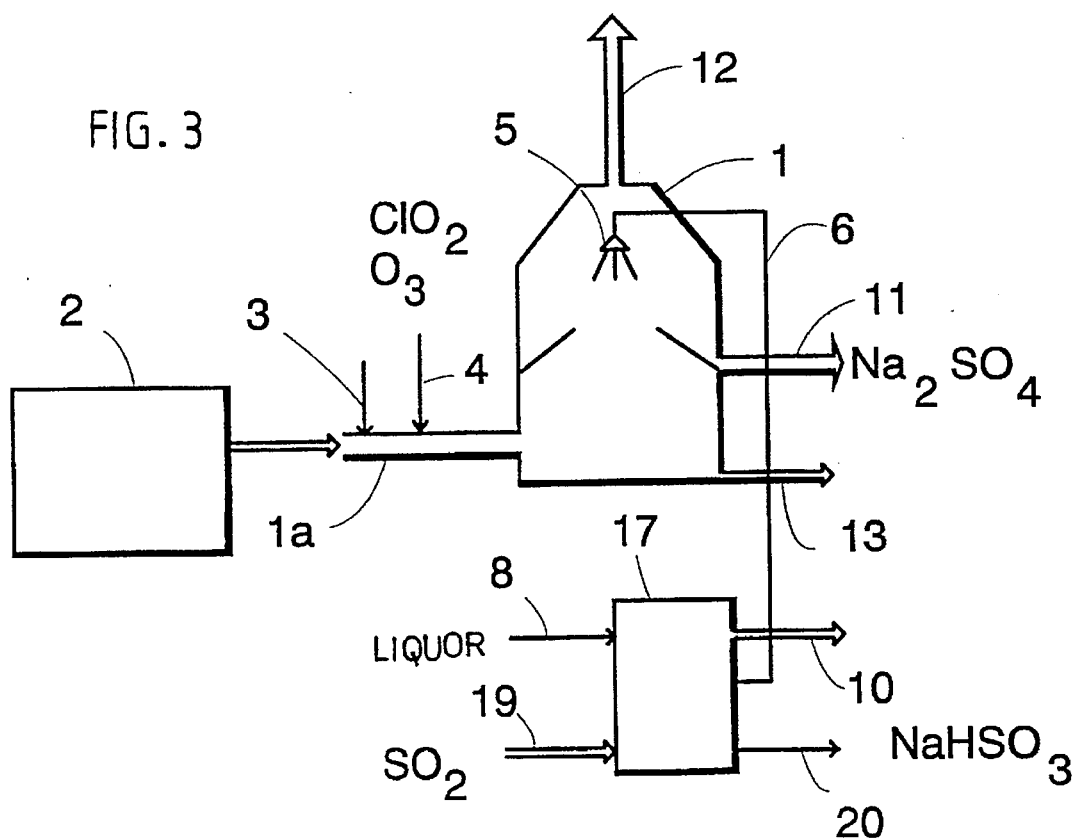
Figure 4:
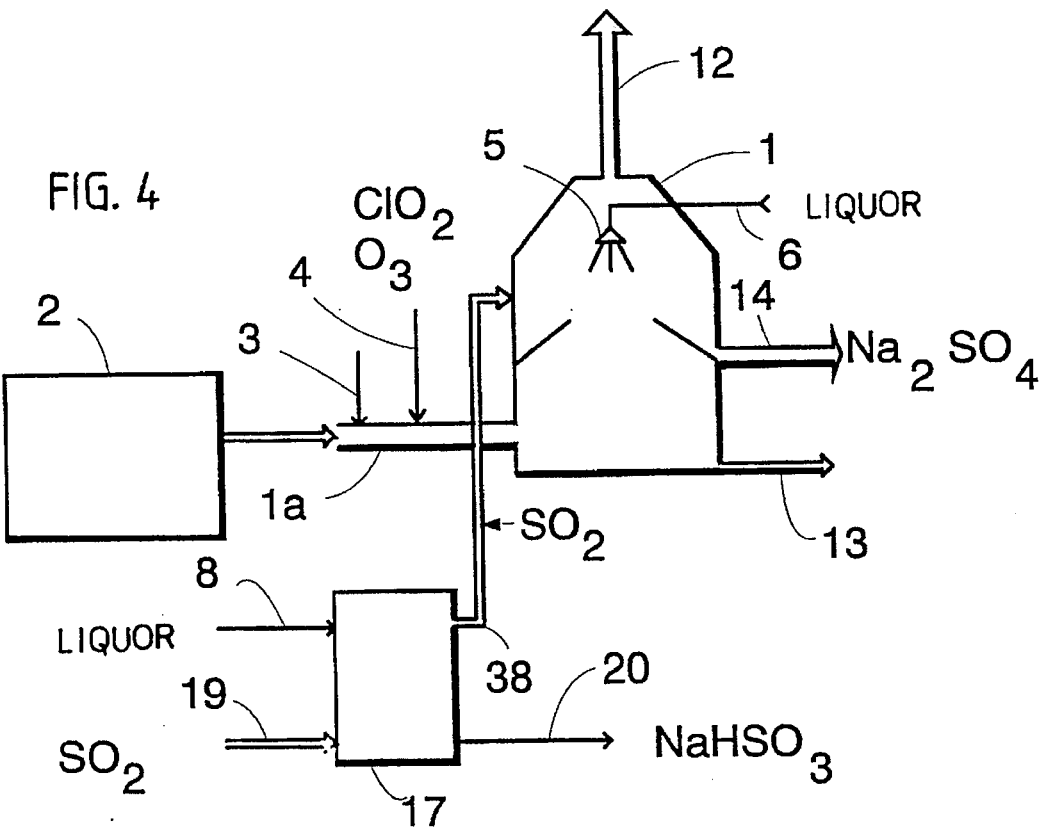

The invention will be described in greater detail in the attached drawings, in which FIG. 1 shows schematically a first embodiment of the process according to the invention, FIG. 2 shows schematically a second embodiment of the invention presented, FIG. 3 shows schematically a third embodiment of the invention and FIG. 4 shows schematically a fourth embodiment of the invention.

FIG. 1 shows a flue gas scrubber 1 of a pulp mill 2, into which scrubber the flue gases of a soda recovery boiler are led through a flue gas duct 1a. The flue gases are made wet in the flue gas duct 1a by injecting water into them through a water line 3. After the wetting of the flue gases, an oxidizer is fed into the flue gas duct 1a through an oxidizer line 4. The oxidizer may be for instance chlorine dioxide $ClO_2$ or ozone $O_3$. The oxidizer can be taken from a bleaching tower of the pulp mill, for example. The oxidizer may also be fed directly into the wetting water. In the flue gas duct 1a, the following reactions take place between the oxidizer and the nitrogen oxide, which reactions result in nitrogen dioxide.

$$2NO + ClO_2 + H_2O = NO_2 + HCl + HNO_3 \qquad (1)$$

$$NO + O_3 = NO_2 + O_2 \qquad (2)$$

The flue gases are scrubbed in the flue gas scrubber 1 by injecting into them reducing sulphurous scrubbing solution coming from the circulation of chemicals of the pulp mill through a nozzle 5, which solution arrives at the nozzle from the production stage of the scrubbing solution through a scrubbing solution line 6. In the case of the figure, the scrubbing solution consists of green liquor taken from the circulation of chemicals of the pulp mill and containing primarily sodium sulphide ($Na_2S$) and sodium carbonate ($Na_2CO_3$), which green liquor is oxidized in a separate oxidizing reactor 7. The green liquor is fed to the upper part of the oxidizing reactor 7 through a liquor line 8 and air or oxygen is fed at the same time through an air duct 9 to the lower part of the oxidizing reactor 7. The oxidizing reactor 7 is typically a gas scrubber, into the lower part of which is in this case fed air and from the upper part of which is injected green liquor against the air flow direction. The following reactions thereby take place in the oxidizing reactor:

$$2Na_2S + 2O_2 + H_2O \rightarrow Na_2S_2O_3 + 2NaOH \qquad (3)$$

When reacting with oxygen and water, the sodium sulphide is thus converted into sodium thiosulphate and sodium hydroxide. The green liquor oxidized in this way is led from the lower part of the oxidizing reactor 7 into the scrubbing solution line 6 and further into the flue gas scrubber 1. On the other hand, the remaining gases are removed from the upper part of the oxidizing reactor 7 through an exhaust duct 10 and they are led from there onwards to the treatment of dilute odor gases. Correspondingly, the following reactions take place in the flue gas scrubber 1:

$$4NO_2+2Na_2S_2O_3 \rightarrow 2N_2+2Na_2SO_4+2S+3O_2 \quad (4)$$

The sodium sulphate and the sulphur are removed from the flue gas scrubber 1 through an exhaust line 11 to a dissolvent and from there back to the circulation of chemicals. Further, the flue gases containing reduced nitrogen are removed into a flue gas duct 12 and the remaining liquid containing chloride is removed from the lower part of the flue gas scrubber 1 through a waste line 13. Also in other embodiments, liquid containing chloride is removed from the lower part of the flue gas scrubber through the waste line 13.

FIG. 2 shows an embodiment of the invention of FIG. 1, in which a scrubbing solution is produced by sulphiting green or white liquor. The liquor to be sulphited is fed through the liquor line 8 to a sulphiting reactor 17, into which is fed sulphur dioxide or flue gases containing sulphur dioxide e.g. from the combustion of odour gases through a duct 19. In the sulphiting reactor 17 the liquor is sulphited and it is led through the scrubbing solution line 6 into the flue gas scrubber 1 shown in FIG. 1. Correspondingly, the sulphur dioxide passed through the sulphiting reactor and the other possible gases are led through the exhaust duct 10 either to a post-absorption stage or to the treatment of dilute odor gases. At the simplest, the sulphiting reactor is a gas scrubber, in which sulphur dioxide flows from the lower part of the scrubber to the upper part and the liquor to be sulphited is injected downwards against the gas flow. In FIG. 2, the reactions take place in the sulphiting reactor 17 as follows:

$$SO_2+2NaOH \rightarrow Na_2SO_3+H_2O \quad (5)$$

Accordingly, the white liquor is sulphited into sodium sulphite and water, which is led into the flue gas scrubber 1 to be injected into the oxidized flue gases, and the final result is a reduction of nitrogen oxide. The following reaction takes place in the flue gas scrubber:

$$NO_2+2Na_2SO_3 \rightarrow \tfrac{1}{2}N_2+2Na_2SO_4 \quad (6)$$

The produced nitrogen is removed together with the flue gas and the produced sodium sulphate is removed for instance to the dissolvent.

When green liquor is sulphited, following reactions take place in the sulphiting reactor 17:

$$Na_2CO_3+SO_2 \rightarrow Na_2SO_3+CO_2 \quad (7)$$

$$Na_2S+SO_2 \rightarrow Na_2SO_3+H_2S \quad (8)$$

$$2Na_2S+3SO_2+Na_2SO_3 \rightarrow 3\,Na_2S_2O_3 \quad (9)$$

The result is then sodium thiosulphate, which injected into the flue gas scrubber reduces the nitrogen oxide in the manner shown by the formula (4).

On the other hand, FIG. 3 shows an embodiment of the process according to the invention, in which into the upper part of the sulphiting reactor 17 is led sodium hydroxide (NaOH) through the liquor line 8 and into the lower part is fed flue gas containing sulphur dioxide through the duct 19 from the odor gas combustion. The same reaction according to the formula (5) occurs here in the sulphiting reactor 17 as in the case shown in FIG. 2. In addition, sodium bisulphite is produced according to the following formula:

$$2Na_2SO_3+O_2 \rightarrow 2Na_2SO_4 \quad (10)$$

$$Na_2SO_4+SO_2+H_2O \rightarrow 2NaHSO_3 \quad (11)$$

The sodium sulphite solution produced in the sulphiting reactor is led through the scrubbing solution line 6 into the flue gas scrubber 1, in which the nitrogen dioxide is reduced according to the formula (6), and in addition, the sodium bisulphite produced is led through an exhaust line 20 to the circulation of chemicals of the mill, e.g. to the dissolvent of the soda recovery boiler or to the bleaching. From the upper part of the sulphiting reactor 17 the gas is removed through the exhaust duct 10.

FIG. 4 shows still a fourth embodiment of the invention, in which the flue gas containing sulphur dioxide and produced at the combustion of odor gases is led through the duct 19 to the lower part of the sulphiting reactor 17 and white liquor is fed to the upper part thereof according to FIG. 2. The way of driving the sulphiting reactor 17 influences on how much bisulphite solution is produced in the reactor and how much sulphur dioxide remains in the gas. In this manner it is possible to regulate the amount of sulphur dioxide coming into the scrubber 1. In this embodiment the sulphur dioxide coming from the reactor 17 is led through the exhaust duct 38 into the flue gas scrubber 1 and into the flue gas scrubber 1 is additionally fed white liquor or NaOH solution through the scrubbing solution duct 6, due to which the sodium hydroxide present in the white liquor or the fed NaOH solution and the sulphur dioxide react with each other, and respectively, the sodium sulphite produced reduces the nitrogen. Thus the reactions according to the formulas (5) and (6) take place in the flue gas scrubber 1. The sodium bisulphite constituting the reaction product in the sulphiting reactor 17 is led through the exhaust line 20 forward to bleaching, steeping or some other suitable place.

In the description above and in the drawings, the invention is described by way of example only and it is not in any way restricted thereto. The essential fact is that the reduction of nitrogen in a flue gas scrubber takes place by means of reagents belonging to the normal circulation of chemicals of a pulp mill.

We claim:

1. A process for removing nitrogen oxides from flue gases of a soda recovery boiler of a pulp mill, the method comprising the steps of adding to said flue gases an oxidizing agent selected from the group consisting of chlorine dioxide and ozone wherein the nitrogen oxides are oxidized to nitrogen dioxide thereby forming a nitrogen dioxide-containing gas stream;

leading said nitrogen dioxide-containing gas stream to a flue gas scrubber;

treating a reagent selected from the group consisting of green liquor, white liquor, and sodium hydroxide to form a reducing scrubbing solution wherein said reagent is from the chemical circulation of the pulp mill;

injecting said reducing scrubbing solution into said nitrogen dioxide-containing gas stream wherein the scrubbing solution reduces the nitrogen dioxide to nitrogen thereby forming a nitrogen-containing gas stream and an oxidized reagent;

and removing said nitrogen-containing gas stream from the flue gas scrubber and leading said oxidized reagent back to the circulation of chemicals of the pulp mill.

2. A process according to claim 1 wherein the reagent is green liquor and the step of treating the reagent comprises contacting the green liquor with air or oxygen thereby oxidizing the green liquor to form sodium thiosulphate and sodium hydroxide.

3. A process according to claim 1 wherein the reagent is green liquor and the step of treating the reagent comprises contacting the green liquor with sulfur dioxide thereby sulphiting the green liquor to form sodium thiosulphate wherein the sulfur dioxide is from the combustion of odour gases of the pulp mill.

4. A process according to claim 1 wherein the reagent is white liquor and the step of treating the reagent comprises contacting the white liquor with sulphur dioxide thereby sulphiting the white liquor to form sodium sulphite wherein the sulfur dioxide is from the combustion of odour gases of the pulp mill.

5. A process for removing nitrogen oxides from flue gases of a soda recovery boiler of a pulp mill, the method comprising the steps of adding to said flue gases an oxidizing agent selected from the group consisting of chlorine dioxide and ozone wherein the nitrogen oxides are oxidized to nitrogen dioxide thereby forming a nitrogen dioxide-containing gas stream;

leading said nitrogen dioxide-containing gas stream to a flue gas scrubber;

treating a reagent selected from the group consisting of white liquor and sodium hydroxide, where said reagent is from the chemical circulation of the pulp mill, with an additional reagent of sulphur dioxide produced from the odor gas combustion in the pulp mill to form a sodium sulphite reducing scrubbing solution;

injecting said reducing scrubbing solution into said nitrogen dioxide-containing gas stream wherein the scrubbing solution reduces the nitrogen dioxide to nitrogen thereby forming a nitrogen-containing gas stream and an oxidized reagent; and removing said nitrogen containing gas stream from the flue gas scrubber and leading said oxidized reagent back to the circulation of chemicals of the pulp mill.

6. A process according to claim 5 wherein a portion of the sulfur dioxide containing flue gases are contacted with the white liquor to produce sodium sulphite which is returned to the circulation of the pulp mill and the remaining portion of the sulfur dioxide containing flue gases are fed to the flue gases of the soda recovery boiler.

* * * * *